United States Patent [19]
Kuljian

[11] 3,818,116
[45] June 18, 1974

[54] COMBINATION TRANSMISSION LINE AND FLUID CONDUIT

[76] Inventor: Harry A. Kuljian, 1845 Walnut St., Philadelphia, Pa. 19103

[22] Filed: Jan. 10, 1973

[21] Appl. No.: 322,486

[52] U.S. Cl.............. 174/15 C, 174/27, 174/28, 174/47
[51] Int. Cl. ........................................ H01b 7/34
[58] Field of Search........... 174/DIG. 6, 14 R, 15 C, 174/16 B, 24, 27, 28, 47, 99 B, 25 G; 138/113, 114

[56] References Cited
UNITED STATES PATENTS

| | | | |
|---|---|---|---|
| 2,141,912 | 12/1938 | Hobart | 174/24 |
| 3,293,407 | 12/1966 | Masao Ando | 174/47 X |
| 3,429,979 | 2/1969 | Davey | 174/15 C |
| 3,562,401 | 2/1971 | Long | 174/15 C |
| 3,609,206 | 9/1971 | McConnell | 174/16 B |
| 3,613,231 | 10/1971 | Pugh | 174/15 C |

FOREIGN PATENTS OR APPLICATIONS

| | | | |
|---|---|---|---|
| 1,167,054 | 10/1969 | Great Britain | 174/15 C |
| 1,541,728 | 9/1968 | France | 174/DIG. 6 |

*Primary Examiner*—A. T. Grimly
*Attorney, Agent, or Firm*—Karl L. Spivak, Esq.

[57] ABSTRACT

A combination electrical transmission line and fluid conduit system including an inner conduit containing electrical transmission line conductors surrounded by an insulating and heat absorption medium such as transformer oil. The heat absorption medium absorbs the heat losses produced by the flow of current through the conductors. An outer fluid carrying conduit completely surrounds and is concentric with the inner conduit. Sufficient spacers are employed to maintain the position relationship between the respective inner and outer conduits. Fluid under pressure is pumped through the annular space defined between the inner and outer conduits and this fluid is heated uniformly by the heat absorption medium to permit pumping in cold envionments without the need for external heating systems. If it becomes necessary to introduce additional heating to keep the fluid at a desired temperature, additional heating can be obtained by installing transformers.

5 Claims, 2 Drawing Figures

COMBINATION TRANSMISSION LINE AND FLUID CONDUIT

BACKGROUND OF THE DISCLOSURE

The present invention relates generally to the field of fluid transmission systems, and more particularly, is directed to the transmission of crude oils under freezing environmental conditions.

When transporting crude oil from the well to the refinery, it is the common practice to employ pipe lines and suitable pumping stations to pump the crude oil over extended distances. The present methods have proved highly satisfactory and reliable when employed under normal conditions of weather and environment. Recently, huge oil deposits have been discovered in the Artic regions such as the North Slope in Alaska. Besides encountering considerable difficulties in drilling wells in these areas, oil company personnel have been experiencing difficulties in removing the oil from the region once it has been brought to the earth's surface. Most often, tanker ships have been employed, due to the extreme cold weather conditions encountered. Additionally, above ground pipe lines have been constructed and it is contemplated that many miles of additional pipe lines will be required to adequately accommodate all of the oil from the North Slope wells. In this later regard, it has been found that the viscosity of cold, crude oil increases rapidly with the extremely low temperature which are usual in this region to such an extent that it is impossible to pump through the usual pipe lines without first preheating the oil, and electric heat tracing the pipe line.

Accordingly, it is now necessary to provide oil heating facilities in addition to pumping stations. It is the usual practice to bleed off some of the crude oil from the pipe line into heating stations and to utilize this oil as energy to fuel oil heaters of the required capacity to heat the oil to a sufficient temperature to permit it to be pumped through the pipe lines. An adequate number of heating stations spaced at predetermined intervals must be provided to counterbalance the cold environmental conditions. The present system is quite costly and inefficient in that large equipment and labor costs are required for the heating stations and considerable quantities of crude oil are employed to power the heaters for oil heating purposes.

SUMMARY OF THE INVENTION

The present invention relates to a combination electrical transmission line and fluid conduit system in general, and more particularly, is directed to a combustion transmission system for both electrical transmission power and crude oil transport purposes.

The present invention incorporates a combination conduit wherein electrical power transmission lines are positioned within an inner conduit and are surrounded by a heat absorbing medium such as transformer oil, sulphur hexa-fluoride ($SF_6$) or compressed air. An outer conduit surrounds the inner conduit and defines an annular space therebetween for crude oil transport purposes.

Inasmuch as electrical transmission lines always produce transmission losses such as $I^2R$ losses and eddy current losses in the form of heat, the heat losses generated by the flow of current can be utilized in heating the crude oil. Accordingly, the present system accomplishes two objectives simultaneously, namely, transmitting the electrical power and utilizing the heat losses for heating the crude oil.

Power for long distance electrical transmission lines power is usually generated at low voltage, 13,200 or 18,000 volts and is stepped up through a transformer to a much higher voltage. The transmission losses in the form of heat can be calculated from the formula $I^2R$ where I is the current in the line and R is the electric wire resistance.

By insulating the outer conduit and utilizing the heat losses of electrical transmission inside the inner conduit, a continuous, uniform and reliable crude oil heating system can be developed without the use of entirely external heaters or the accompanying heating stations, boilers, burners and expense as required by the pipe line systems persently in use in Artic environments.

It is therefore an object of the present invention to provide an improved combination transmission line and fluid conduit system of the type set forth.

It is another object of the present invention to provide a novel combination electrical transmission line and fluid conduit system which utilizes the heat losses produced by the electrical transmission power lines to heat fluids such as crude oil within an elongated conduit system.

It is another object of the present invention to provide a novel combination transmission line and fluid conduit system which employs an inner conduit and outer conduit, the said inner and outer conduits being concentrically spaced by means of plurality of mechanical spacers.

It is another object of the present invention to provide a novel combination electrical transmission line and fluid conduit system which incorporates a concentric arrangement of an inner conduit and an outer conduit, the said inner conduit containing electrical power transmission lines contained within an absorbing fluid and wherein the annular space defined between the inner conduit and the outer conduit contains crude oil.

It is another object of the present invention to provide a novel combination transmission line and fluid conduit system which employs a means to utilize the heat losses of electrical power transmission lines to continuously and uniformly heat crude oil being transmitted within the system.

It is another object of the present invention to provide a novel combination transmission line and fluid conduit system that is simple in design, rugged in construction and trouble free when in use.

Other objects and a fuller understanding of the invention will be had by referring to the following description and claims of the preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
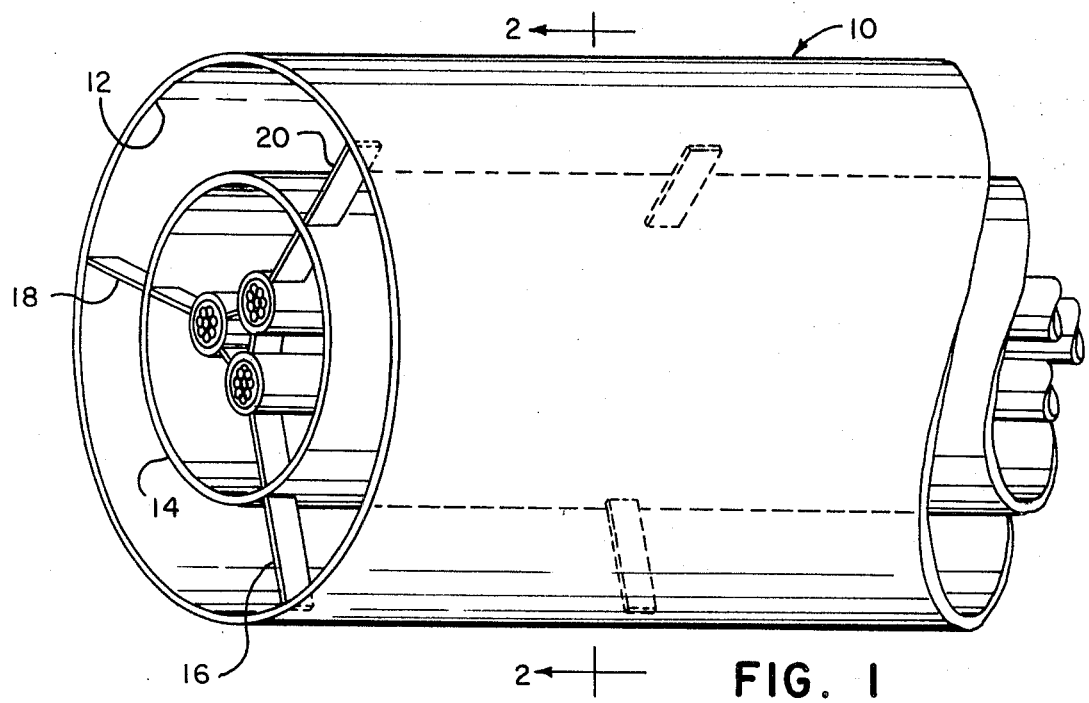
FIG. 1 is a perspective view of a portion of a combination electrical transmission line and fluid conduit system constructed in accordance with the teachings of the present invention.

Although specific terms are used in the following description for the sake of clarity, these terms are intended to refer only to the particular structure of my invention selected for illustration in the drawings and are not intended to define or limit the scope of the invention.

Figure 2:
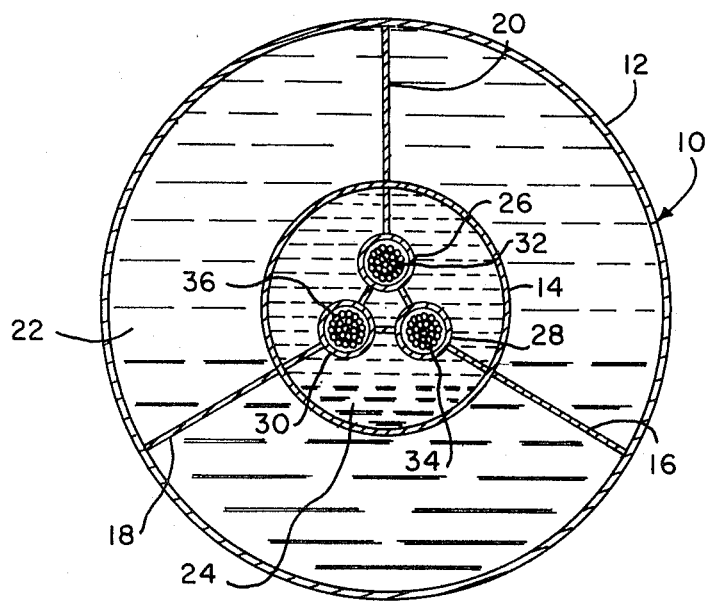
FIG. 2 is a cross sectional view taken along line 2—2 of FIG. 1 looking in the direction of the arrows.

Referring now to the drawings, I show in FIGS. 1 and 2 a combination electrical transmission line and fluid conduit system generally designated 10 which comprises a fluid carrying outer conduit 12 and an inwardly positioned electrical transmission line carrying inner conduit 14. A plurality of longitudinally spaced, electrically non-conductive spacers 16, 18, 20 radially extend to position the conduits 12, 14, preferably in concentric relationship.

Intermediate, the inner conduit 14 are positioned a plurality of wire conduits 26, 28, 30 to contain the electrical transmission wires 32, 34, 36 in well known manner. Optionally, the wires 32, 34, 36 can be accommodated within the conduit 14 without the wire conduits 26, 28, 30. In the embodiment illustrated, three similar conduits 26, 28, 30 are illustrated. It will be appreciated however, that more or fewer conduits 26, 28, 30 or more or fewer electrical transmission wires 32, 34, 36 may be employed within the interior space defined within the inner conduit 14 and still come within the scope and intent of this disclosure.

Preferably, both the inner conduit 14 and the outer conduit 12 are fabricated of the same material, such as aluminum, to prevent magnetic flux generation. The outer periphery of the outer conduit 12 preferably is heat insulated in conventional manner by an outer protective jacket 17.

As previously indicated, it is the usual practice to transmit electrical power loads to long distances at relatively high voltages. Such loads are preferably three phase, alternating current and are either delta connected or Y connected in accordance with usual electrical power transmission techniques. The delta connected systems employ three wires and the Y connected systems require four wires, the fourth wire being the neutral conductor. Whether delta or Y connected, all of the transmission wires will be contained within the inner conduit 14.

It is essence of this invention to utilize the principle that the percentage power loss in an electrical transmission system varies directly with the resistance and directly as the square of the current. These losses are usually referred to as $I^2R$ losses, which are dissipated into the surrounding air in the form of heat. In accordance with usual electrical transmission line design calculations, the size of the conductors is optimized to economically balance the cost of the conductor with the need to hold the power loss within acceptable standards.

The heat generated by the $I^2R$ losses in the electrical transmission wires 32, 34, 36 is retained within the interior space defined by the inner conduit 14. Preferably, the space between the conduits 26, 28, 20 and the interior periphery of the inner conduit 14 is filled with a heat absorbing means 24 whereby all heat generated by the $I^2R$ losses in the electrical transmission system is absorbed directly by the fluid 24. It has been found that absorbing fluids such as compressed sulphur hexafloride ($SF_6$), dry compressed air or transformer oil could be employed for this purpose. Thus, the $I^2R$ losses in the electrical transmission system will be conducted directly to the absorbing fluid 24 in a uniform manner throughout the entire length of the conduit system 10 to uniformly heat the insulating fluid 24.

The annular space defined between the exterior periphery of the inner conduit 14 and the interior periphery of the fluid carrying outer conduit 12 is utilized for pipe line purposes in conventional manner, such as for pumping crude oil 22. The inner conduit 14 thus serves as a continuous elongated heater for the crude oil 22 by uniformly, peripherally transmitting heat generated by the electrical transmission wires 32, 34, 36 directly to the crude oil 22.

It will be appreciated that the conduit arrangement illustrated in FIGS. 1 and 2 is diagrammatic only and that the number of wires, number of conduits, the arrangement of spacers and the relative diameters of the conduits 12, 14 can be widely varied other than as illustrated and still come within the intent and meaning of this invention. In the embodiment illustrated, the spacers 16, 18, 20 are employed to position the wire conduits 26, 28, 30 within the interior conduit 14. It is possible that designs can be employed without requiring the need for wire carrying conduits at all and the electrical transmission lines could be positioned inside of the inner conduit 14 directly by employing suitable insulators (not shown) in conventional manner. Also, it would be possible to enlarge the diameter of the inner conduit 14 and employ it for crude oil transmission purposes. In this arrangement, the electrical wires 32, 34, 36 and the absorbing fluid 24 would be positioned in the annular space defined between the inner and outer conduits 14, 12 for oil heating purposes.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a combination electrical transmission line and fluid conduit system to transmit electrical power having heat losses and a fluid, the combination of
   A. a first conduit, including peripheral walls,
      1. said first conduit defining a first elongated interior space;
   B. a second conduit enveloping the first conduit,
      1. said first and second conduits defining an elongated annular fluid carrying space therebetween,
      2. said first and second conduits being concentrically arranged;
   C. a plurality of first spacers bridging across the fluid carrying space,
      1. said first spacers interconnecting the first conduit and second conduit,
      2. said first spacers maintaining the concentric relationship between the first and second conduits,
      3. said first spacer being circumferentially spaced;

D. a plurality of electrical transmission line wires contained within the first interior space in fixed relationship,
   1. said wires being concentrically positioned within the first interior space;
E. a plurality of second spacers contained within the first interior space,
   1. said second spacers extending between the first conduit and the wires to maintain the wires in fixed relationship,
   2. said second spacers being fabricated of electrically insulating material,
   3. said second spacers being circumferentially spaced;
F. a heat absorbing means filling the first interior space and surrounding the electrical transmission line wires and the second spacers,
   1. said heat absorbing means absorbing the said heat losses from the electrical wires uniformly throughout the first conduit,
   2. said heat absorbing means applying the heat from the heat losses to the periphery of the first conduit walls to heat the walls; and
G. said fluid filling the said annular fluid carrying space,
   1. said fluid being heated by heat from the said first conduit walls.

2. The invention of claim 1 wherein the first and second conduits are fabricated of the same material.

3. The invention of claim 2 wherein the material is aluminum.

4. The invention of claim 3 and an insulating jacket covering the said second conduit.

5. The invention of claim 3 wherein each said first spacer radially aligns with a second spacer, the aligned first and second spacers being positioned in radially extending relation.

* * * * *

UNITED STATES PATENT OFFICE
CERTIFICATE OF CORRECTION

Patent No. 3,818,116      Dated June 18, 1974

Inventor(s) Harry A. Kuljian

It is certified that error appears in the above-identified patent and that said Letters Patent are hereby corrected as shown below:

Column 1, line 52, "combustion" should read -- combination --.

Signed and sealed this 8th day of October 1974.

(SEAL)
Attest:

McCOY M. GIBSON JR.
Attesting Officer

C. MARSHALL DANN
Commissioner of Patents